United States Patent [19]

Pesek et al.

[11] Patent Number: 4,904,632
[45] Date of Patent: Feb. 27, 1990

[54] SURFACE-MODIFIED CHROMATOGRAPHIC SEPARATION MATERIAL

[76] Inventors: Joseph J. Pesek, 4142 Rosenbaum Ave., San Jose, Calif. 95136; Sally A. Swedberg, 793 Allen Ct., Palo Alto, Calif. 94303

[21] Appl. No.: 64,329

[22] Filed: Jun. 19, 1987

[51] Int. Cl.$^4$ .................. B01J 31/02; B01J 20/10; B01J 20/30
[52] U.S. Cl. .................. 502/158; 502/401; 435/176; 435/177
[58] Field of Search .................. 502/152, 158, 401

[56] References Cited

U.S. PATENT DOCUMENTS

| | | | |
|---|---|---|---|
| 3,474,123 | 10/1969 | Kelly et al. | 260/448.2 |
| 3,672,131 | 6/1972 | Halasz | 55/386 |
| 3,795,313 | 3/1974 | Kirkland et al. | 210/198 C |
| 3,839,385 | 10/1974 | Meiller et al. | 260/448.2 |
| 3,892,678 | 7/1975 | Halasz et al. | 252/426 |
| 3,956,179 | 5/1976 | Sebestian et al. | 252/430 |
| 3,987,058 | 10/1976 | Saunders et al. | 502/401 X |
| 4,257,916 | 3/1981 | Hancock et al. | 252/430 |
| 4,482,752 | 11/1984 | Mitchell et al. | 585/670 |
| 4,520,122 | 5/1985 | Arena | 502/152 |
| 4,539,399 | 9/1985 | Armstrong | 536/103 |
| 4,648,975 | 3/1987 | Barkatt et al. | 210/656 |
| 4,650,784 | 3/1987 | Ramaden et al. | 502/407 |
| 4,661,248 | 4/1987 | Ramsden et al. | 210/198.2 |

OTHER PUBLICATIONS

Pesek, J. J., et al, (1986) Journal of Chromatography 361, 83-92.
Halasz, I., et al, Angew. Chem. Internat. Edit. vol. 8 (1969) No. 6, 453-454.
Deuel, H., et al, Helvetica Chimica Acta, 1160-1165 (1959) (translation also).
Hunter, M. J., et al, Industrial and Engineering Chemistry (1974) vol. 39, No. 11, 1389-1395.
Wartmann, J., et al, Helvetica Chimica Acta, 1166-1170 (1959) (translation also).
Pesek, J. J., et al, Analytical Chemistry (1977) vol. 49, No. 1, 133-137.
Saunders, D. H., et al, Analytical Chemistry (1974) vol. 46, No. 7, 834-838.
Locke D. C., et al, Analytical Chemistry (1972) vol. 44 No. 1, 90-92.
Pyrde, A., Journal of Chromatographic Science (1974) vol. 12, 486-498.
Cheng et al, J. of Chromatography (1985) 318 173-185.
Smith, J. of Chromatography (1982) 236-320.
Gidding et al, Advances in Chromatography, vol. 14, Marker Dekker 1976 pp. 75-86.
Sebastian et al, Chromatographia (1974) vol. 7, No. 8, 371-375.

*Primary Examiner*—Patrick P. Garvin
*Attorney, Agent, or Firm*—Irell and Manella

[57] ABSTRACT

A method is provided for modifying a porous chromatographic material such as silica, alumina, thoria, titania or magnesia, which involves the steps of halogenating the surface hydroxyl groups of such material, and reacting the halogenated surface with a suitable alkylation reagent. The method gives a direct surface-to-carbon linkage in a high-yield reaction.

13 Claims, 4 Drawing Sheets

SURFACE-MODIFIED CHROMATOGRAPHIC SEPARATION MATERIAL

TECHNICAL FIELD

This invention relates to a surface modified material useful in a number of chromatographic applications (packed column, open column, thin-layer, affinity, ion exchange, gel filtration) and other sorption or filtration processes, e.g., in the areas of catalysis and photovoltaics. More particularly, the invention pertains to an alkylated material such as alkylated silica which is acid- and base-stable, displays improved adsorptive properties, is capable of further functionalization, and is substantially free of contamination.

BACKGROUND

While silica is a widely preferred sorbent due to its high surface area and sorption energy, certain applications requiring highly controlled selective sorption are hindered by its relatively high and nonuniform energy for adsorption as well as its nonspecific interaction with many materials. An example of a selective sorption process hindered by the nonuniform, high surface energy of silica is the chromatography of pharmaceuticals, proteins, peptides, nucleotides and other hydrophilic substances important in biotechnology. To overcome this problem, there have been many methods developed for the modification of silica to reduce and make uniform its adsorptive properties and to improve its selectivity for one or more compound(s) of interest.

Early work on the modification of silica described (1) the use of an esterification reaction between surface silanol groups and an alcohol to give Si-O-C linkages (Halasz and Sebestian, *Angew. Chem. (Int. Ed.)* 8 453 (1969); Deuel et al., *Helv. Chim. Acta* 119:1160 (1959)), (2) reactions of alkylchlorosilanes with surface silanols to form Si-O-Si-C linkages (Hunter et al., *Indus. and Engin. Chem* 39:1389 (1947)), (3) chlorination of the silanols followed by reaction with an amine to form Si-N bonds (Deuel et al., supra), and (4) chlorination of a silicon dioxide surface followed by alkylation (Wartmann and Deuel, *Helv. Chim. Acta* 119:1166 (1959)).

Other work relating to modification of silica is described in several patents and publications. U.S. Pat. No. 3,359,214 to Aftandilian, for example, describes a method of increasing the number of surface hydroxyl groups on silica, by reaction of the surface silanols first with silicon tetrachloride and following with hydrolysis of the silicon-chlorine bonds so formed. U.S. Pat. No. 3,839,385 to Meiller shows the "grafting" of organic groups (typically halogenated organosilanes having a central ester linkage) onto silica gel particles. Several patents show the introduction of sulfonate or sulfonic acid groups into a silica matrix, e.g. U.S. Pat. Nos. 4,257,916 to Hancock et al. and 4,661,248 to Ramsden et al. U.S. Pat. No. 4,520,122 to Arena discloses preparation of metal-alkyl complexes on the surface of silica particles.

Thus, a number of chemically modified silica particles are commercially available for a variety of chromatographic purposes. An important consideration in the preparation of such modified particles is their stability under a range of conditions of use, e.g. with regard to variation in temperature, pH and the like. The original commercially modified silicas based on the Si-O-C linkages are thermally stable and thus suitable for gas chromatography, which is an anhydrous method. However, such silicas are readily hydrolyzed and are thus unsuitable for liquid chromatography of pharmaceuticals, biomolecules, and the like, which requires the use of aqueous eluting solvents. The development of the Si-O-Si-R linkages (in U.S Pat. No. 3,956,179 to Sebestian et al., for example, $R=C_{18}H_{32}$), which linkages are hydrolytically stable to neutral and weakly acidic eluants, extended the application of chemically modified silicas into liquid chromatography. However, the Si-O-Si-R linkages, being unstable to basic hydrolysis, cannot be used with alkaline eluants, which is a serious limitation. Additionally, stability of Si-O-Si-R, where R is less than five carbon atoms, is limited even in mildly alkaline eluants due to reduction of hydrolytic protection afforded by the larger hydrophobic R groups (e.g., $C_{18}H_{32}$). Because alkaline eluants and chemically modified silica particles incorporating short hydrocarbon chains (i.e., R is $CH_3$ or $C_2H_5$) are preferred for analysis of proteins and peptides, currently available chromatography particles based on silica are inadequate for many applications.

Attempts at using a chlorination/Grignard or chlorination/organolithium reaction sequence to modify silica sorbents have been limited by two factors. The first is the relative ease of producing materials from the one-step alkylchlorosilane reactions (e.g., as described in U.S. Pat. No. 3,956,179 to Sebestian et al., cited supra) versus the two-step chlorination/Grignard process. For alkylchlorosilation, refluxing the reagent in a suitable solvent (such as toluene) in the presence of silica yields the desired product. The second limitation involves the residual salts (MgBrCl or LiCl) which are deposited on the surface after the second reaction with the Grignard or organolithium compound. Both of these problems have prevented further development of this two-step reaction sequence.

In spite of these problems, it is nevertheless desirable to develop a process utilizing such a two-step reaction sequence in order to increase the versatility of the modification process and the stability of the final product, i.e., to variation in temperature and pH as well as to hydrolysis generally. That is, in other types of modification methods, it is frequently not possible to synthesize the appropriate silane material which will then yield the desired final product. In this case, synthesis of a Grignard reagent or organolithium compound offers an alternative to the alkylchlorosilane pathway and more versatility insofar as the number and type of organic substituents which may be introduced onto the silica surface. Such an alternate method is only useful, however, if the undesirable salt by-products can be eliminated and if the reaction proceeds in high yield, i.e., comparable to that of the alkylchlorosilane reaction. Thus, while the chemistry for creating Si-C linkages has been known, practical applications of this chemistry to the production of chemically modified sorbent particles containing a Si-C bond has never been achieved due to technical problems in synthesis and purification.

DISCLOSURE OF THE INVENTION

In one aspect of the invention, a surface-modified material is provided comprising particles of an inorganic oxide, the surface hydroxyl groups of which have been modified so as to provide an alkylated surface having a plurality of covalent surface-to-carbon linkages.

In another aspect of the invention, a method for modifying the surface of a material comprised of an inorganic oxide is provided, comprising the steps of: halogenating the surface hydroxyl groups of said material so as to give a halogenated surface; and reacting said halogenated surface with an alkylation reagent selected from the group consisting of Grignard reagents and organolithium reagents, whereby direct linkage of said material to carbon is provided.

It is a primary object of the present invention to overcome the disadvantages of the prior art noted above. It is a further object of the invention to provide a surface-modified chromatographic material which is stable to extremes of pH and temperature, displays improved adsorptive properties, is capable of further functionalization, and is substantially free of contamination, e.g. with residual salts or the like. The method of making this material is an extremely versatile one in that it allows bonding of virtually any organic substituent to a chromatographic material such as silica, alumina, etc., in a clean, high-yield reaction.

MODES FOR CARRYING OUT THE INVENTION

Figure 1:
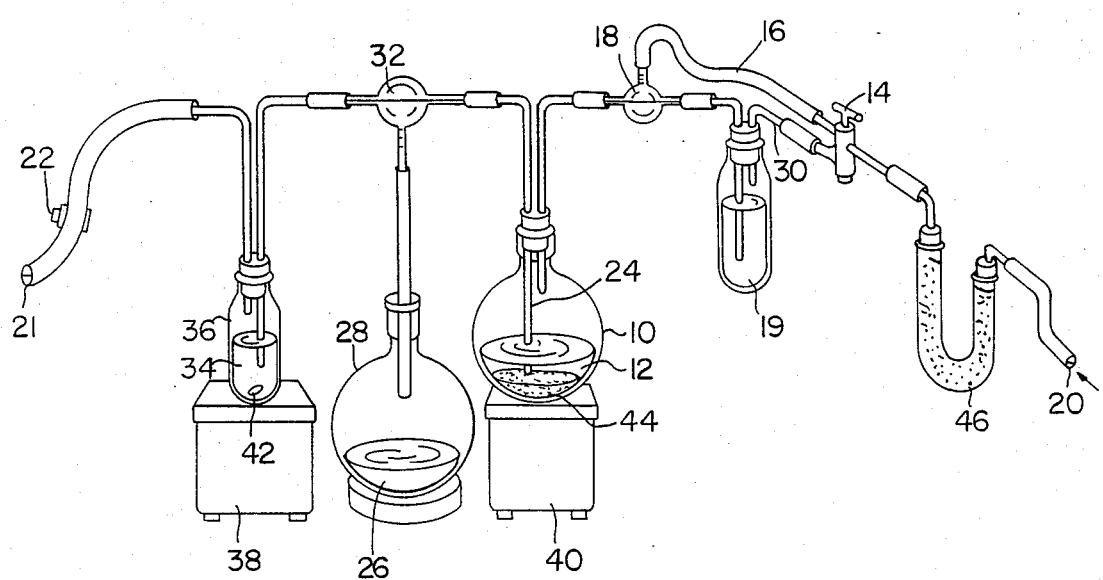
FIG. 1 illustrates an apparatus for carrying out the method of the invention, as described in Example 1.
Figure 2:
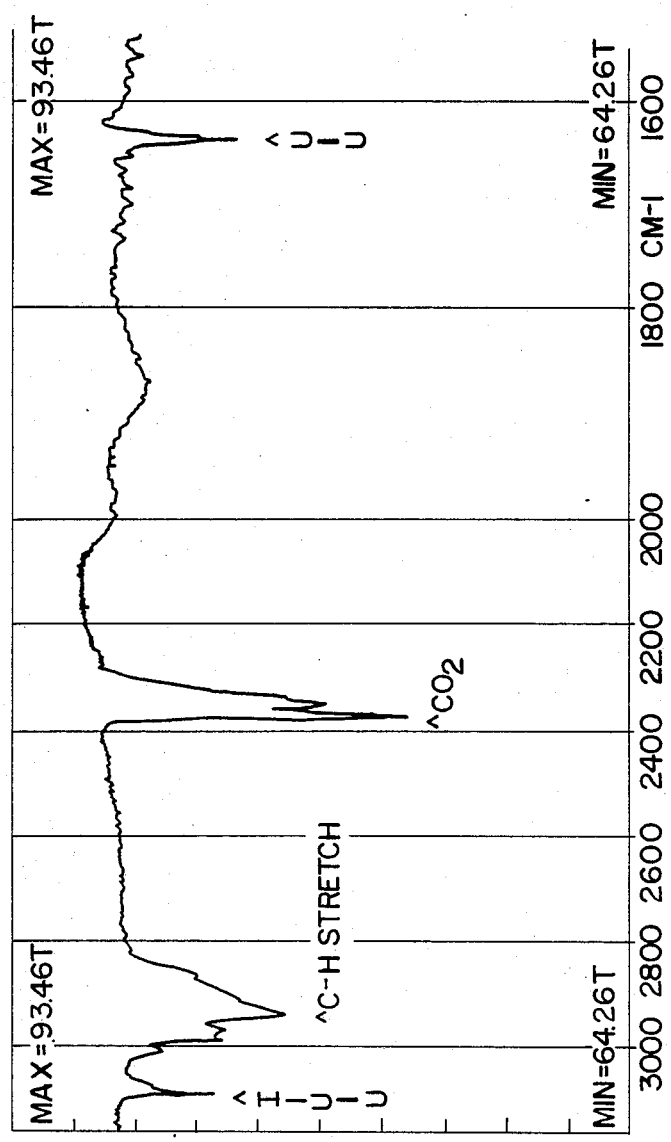
FIG. 2 gives a partial IR spectrum of an allyl-bonded stationary phase prepared according to the invention, as described in Example 3.

This invention differs from most of the methods and materials currently available by using a direct surface-to-carbon bond instead of an Si-O-Si-C type of linkage. We have now overcome the synthetic problems and developed the first practical chemically modified sorbent particles based on silica bearing a direct Si-C linkage. Such particles have been found to greatly extend the application of liquid chromatography to analysis of biomolecules. This invention involves a unique process for preparing the chemically modified particle that results in high yields and which includes a novel clean-up procedure that is successful in removing the undesired salt by-products.

In a preferred embodiment, the chromatographic material to be modified according to the method described herein is silica, and in a particularly preferred embodiment, is porous, particulate silica. Alternative suitable materials include other inorganic oxides such as alumina, thoria, titania, magnesia and combinations thereof, also preferably in porous, particulate form.

The modification method of the present invention is basically a two-step process. One or more inorganic oxides as described above is provided; such a material necessarily has a plurality of surface hydroxyl groups. These surface hydroxyl groups are first halogenated so as to give a halogenated surface. In the case of chlorinating silica, for example, the surface silanol groups would be converted to Si-Cl moieties. In the second step, the halogenated surface is reacted with an alkylation reagent so as to give a direct linkage of the surface to carbon. For example, in the case of Si-Cl, reaction with methyl magnesium bromide as the alkylation reagent would give Si-CH$_3$, directly linking the silicon surface to an alkyl, i.e., methyl, substituent.

The halogenation step is carried out as follows. A predetermined quantity of inorganic oxide, e.g. silica, is added to a preferably anhydrous, aprotic solvent such as toluene and a suitable excess of a halogenating agent is added thereto, preferably a Lewis base halogenating reagent such as thionyl chloride, thionyl bromide or phosgene. The reaction is allowed to proceed for 16-18 hours at reflux, at which point the halogenated material is isolated and washed (see Examples 1 and 2).

Alkylation is effected using either a Grignard reagent RMgBr or an organolithium compound RLi, where R may be virtually any organic substituent providing that R does not include functionalities such as carbonyl, hydroxyl, di-halo, tri-halo or the like, which would react with the Grignard or organolithium reagent itself. R may be, for example, alkyl, alkenyl, alkynyl, or aryl unsubstituted or substituted with alkyl, alkenyl, or alkynyl. Typically, the alkyl, alkenyl or alkynyl substituent have from one to about eighteen carbon atoms, and at most one unsaturated bond. Many of these compounds are available commercially. However, they may also be readily synthesized. The Grignard reagents, for example, may be prepared by admixing a compound of formula RBr (e.g., allyl bromide) with magnesium in an inert atmosphere (see Example 1). The organolithium compounds, also, may be prepared by admixture of a compound of formula RBr with lithium metal (see Example 1). Contacting the halogenated silica with a suitable alkylation reagent as described gives virtually instantaneous alkylation. The product is a chromatographic separation material having a plurality of surface Si-R groups, where R is as given above.

As a result of this initial invention we have been led to an additional discovery of the effectiveness of using a monounsaturated hydrocarbon group in which the unsaturated bond is between the two terminal carbon atoms so as to allow for further functionalization. Such a group is given by the structure —(CH$_2$)$_n$—CH=CH$_2$, where n is typically between about one and about sixteen. The corresponding Grignard and organolithium reagents are then given by the formula CH$_2$=CH—(CH$_2$)$_n$MgBr and CH$_2$=CH—(CH$_2$)$_n$Li respectively. A particularly preferred group is an allyl (—CH$_2$—CH=CH$_2$) group. In addition to its hydrolytic stability, allyl-bonded silica and analogous phases have been shown to have advantages as a "reagent particle" which can be a precursor to a variety of hydrolytically stable silica particles bearing specific functional groups. These groups may be chosen so as to selectively interact with analytes of interest in the practice of ion exchange, affinity chromatography, catalysis, and chemically specific detection media.

The inorganic oxides which provide suitable substrates for the present invention are preferably of relatively high surface area (>50 m$^2$/g) and of fairly uniform small size (1-100 microns), which have been reacted as described below to produce a high density of direct Si-C linkages. In the case of chromatography particles, the linkage may be to virtually any organic group. When particles of approximately uniform size are prepared as described and packed into a chromatographic column, their stability to hydrolysis in both acidic and alkaline media is markedly enhanced as compared to currently available silica-based materials.

After alkylation of the halogenated surface, a "cleanup" step is followed so as to remove contaminating salts from the alkylated material. In the case of chlorination, for example, use of a Grignard or organolithium reagent will result in residual, contaminating MgBrCl or LiCl. The solid is subjected to an acid-base washing cycle wherein the solid is alternately washed with dilute base and dilute acid so as to insure dissolution of residual salts. The acid-base washing cycle is followed by a wash with deionized water and a subsequent wash with a suitable alcohol such as ethanol or methanol. The solid so obtained is then dried at an elevated temperature (typically about 110° C. or higher) overnight. The overall yield of the conversion process is generally about 50% (i.e., conversion of surface silanol groups), while 90% of the solid is typically recovered.

In the case of reagent particles, the linkage is Si—$(CH_2)_n$—CH=$CH_2$ where n is generally in the range of one and sixteen inclusive. Said reagent particles may be reacted as follows to produce particles having specific, desired chemical affinities for analytes of interest.

| Reactants | Silica-Bonded Product |
|---|---|
| Si—$(CH_2)_n$—CH=$CH_2$ + BBN*,$OH^-$,$H_2O_2$ | Si—$(CH_2)_nCH_2CH_2OH$ |
| Si—$(CH_2)_n$—CH=$CH_2$ + THF,$H_2O$,$H-$ | Si—$(CH_2)_nCH(OH)CH_3$ |
| Si—$(CH_2)_n$—CH=$CH_2$ + HBr,peroxide | Si—$(CH_2)_nCH_2CH_2Br$ |
| Si—$(CH_2)_n$—CH=$CH_2$ + HBr,no peroxide | Si—$(CH_2)_nCHBrCH_3$ |
| Si—$(CH_2)_n$—CH=$CH_2$ + $O_3$ | Si—$(CH_2)_nCHO$ |
| Si—$(CH_2)_n$—CH=$CH_2$ + $HSO_3^-$,AIBN** | Si—$(CH_2)_nCH_2CH_2SO_3^-$ |
| Si—$(CH_2)_n$—CH=$CH_2$ + CO,$H_2O$,$Rh_2O_3$, pyrrolidine | Si—$(CH_2)_n(CH_2)_3$—pyrrolidine |

*BBN: 9-borabicyclononane
**AIBN: azobisisobutyronitrile

As may be seen, the Si—$(CH_2)_n$—CH=$CH_2$ linkages react with various compounds R' which functionalize at the double bond, i.e., to give Si—$(CH_2)_n$—$CH_2$—$CH_2$—R' surface linkages. Examples of R' are given in the table above, but can clearly include virtually any substituents which would react with a terminal double bond.

Subsequent reactions of silica-bonded products from these reagent particles may be done as follows:

| | |
|---|---|
| Si—$(CH_2)_nCHO$ + $Cr_2O_7^-$,$H^+$ | Si—$(CH_2)_nCOOH$ |
| Si—$(CH_2)_nCH_2CH_2Br$ + KCN | Si—$(CH_2)_nCH_2CH_2CN$ |
| Si—$(CH_2)_nCOOH$ + ROH,HCl | Si—$(CH_2)_nCOOR$ |
| Si—$(CH_2)_nCH_2CH_2CN$ + $H_2$,Ni | Si—$(CH_2)_nCH_2CH_2NH_2$ |

Further reactions are preferably with substituents possessing specific biological recognition, e.g., antibodies, enzymes, cofactors, and biomimetic species such as reactive dyes. It should be noted that the above represent only a few examples of the many reactions that could be used to produce new stationary phases from the allyl reagent particle. The reactivity of the double bond enables the production of phases that could not be made by conventional organochlorosilane reagents. For example, there is no commercial source of an organochlorosilane reagent that contains either the aldehyde or carboxylic acid functional groups. As shown above, these materials can be synthesized from the novel allyl reagent particles.

The chromatographic separation material so provided, as noted above, is quite stable to extremes of pH and temperature (up to at least about 450° C.) and is substantially free of contamination with residual salts, i.e., there is no interference resulting from the presence of such salts during use.

A preferred apparatus for use in carrying out the present method is illustrated in FIG. 1. Reaction vessel 10 contains the reaction mixture 12, which initially, in a preferred embodiment, is chlorinated silica (see Example 2). Prior to alkylation, first valve 14 is opened to upper path 16, while second valve 18 is closed to reservoir 19 containing the reaction solvents. The system is then purged with an inert gas such as dry nitrogen, by introducing the gas through inlet 20 into the system which after circulating through the system may exit through outlet 21; clamp 22 controls the outward flow of gas and may be used to close off the system. Tube 24 is lowered into the reaction mixture, allowing pumping off of excess reagent 26 into waste container 28. First and second valves 14 and 18 are then turned so as to open the lower path 30, and dry reaction solvents contained in reservoir 19 are cycled through the reaction vessel. Second valve 18 and third valve 32 are closed so as to isolate the chlorinated silica.

At this point, alkylation reagent 34 is placed in reservoir 36. First and second valves 14 and 18 are opened to the upper path, and third valve 32 is turned from waste container 28 to reservoir 36. While stirring the solutions in reservoir 36 and reaction vessel 10 via magnetic stirrers 38 and 40 and stirring bars 42 and 44, nitrogen gas pressure is used to pump the Grignard reagent or organolithium reagent from the reservoir 36 into the reaction vessel. Drying tube 46 ensures that the reaction system is moisture-free.

It is to be understood that while the invention has been described in conjunction with the preferred specific embodiment thereof, that the foregoing description as well as the examples which follow are intended to illustrate and not limit the scope of the appended claims.

EXAMPLE 1

Chlorination of the Silica

Twenty g of silica were placed in a 500 ml round-bottom flask. Fifty ml of dry thionyl chloride and 450 ml of dry toluene were added, and gentle mechanical stirring was used to mix the contents of the flask (the stirring bar was kept in the flask throughout the chlorination step for later use in the procedure). The flask was fitted with a 60 cm West condensor and the contents were allowed to reflux for 16-18 h. The heating mantle was removed and the contents allowed to cool before a septum was wired onto the flask. Using a cannula, the chlorinated silica was pumped into 50 ml septum-capped centrifuge tubes. The tubes were then counterbalanced with tubes containing water and spun at 3000 rpm (ca. 1000 g). To remove the residual thionyl chloride, the excess liquid was pumped into a waste container and 45 ml of dry toluene was pumped into the tubes. The tubes were again counterbalanced and centrifuge as described above. This process was repeated three times, with dry ether being substituted for toluene in the final wash. The ether supernatant was kept over the chlorinated silica until the Grignard or organolithium reagent was available.

Preparation of the Grignard Reagent

One neck of a three-necked round-bottom flask was equipped with a septum, another neck with a 60 cm West condenser, and the third neck with a 500 ml separatory funnel. To this flask was added about 17 g of magnesium and a stirring bar. Before initiating the Grignard reaction, the flask was flame dried. During the flaming, the flask was purged with nitrogen through the septum port via a syringe needle connected to the end of the nitrogen line. The nitrogen purge was continued throughout the reaction.

Approximately 55 ml (0.65 moles) of allyl bromide in 350 ml of distilled ether was then added to the separatory funnel. This mixture was then added slowly to the flask with adequate stirring. The reaction proceeded smoothly and was controlled with an ice bath. After the complete addition of the allyl bromide-ether mixture, the contents of the reaction vessel was allowed to mix for an additional 30 min. The condensor and the funnel was removed and quickly replaced with septa. When the last septum was in place, the nitrogen line is removed.

Preparation of Orqanolithium Reagent

To a three-necked 500-ml round-bottom flask equipped with a West condenser, a helium or nitrogen line, stirring bar, and self-equilizing funnel, 25 ml of anhydrous ether were added. Prior to the addition, the entire apparatus was flamed out to remove moisture, a drying tube was attached, and a constant stream of nitrogen or helium was kept flowing through the apparatus. Next, 10 g of high purity lithium wire was added to the flask in small segments to maximize the surface area. The mixture of ethyl ether and lithium metal was brought to reflux for 0.5 h. Then 0.1 moles of the allyl bromide in 200 ml of anhydrous ethyl ether was slowly added to the refluxing mixture. As the reaction proceeded, the lithium metal took on a bright gold color and the ether solution became cloudy. Cessation of the reaction was indicated by the dulling of the lithium metal.

Reaction of Alkylation Reagent with Chlorinated Silica and Clean-Up Procedure (a) The ether remaining in the centrifuge bottles after the wash steps previously described was pumped off and the Grignard reagent was pumped in up to a predetermined 50 ml mark. The septa were then removed from the centrifuge bottles and fitted with ground-glass stoppers. The contents were mixed thoroughly for 1 h.

The bottles were centrifuged as described above and the excess Grignard reagent was decanted into a waste container. To the dried solid a 0.001 M sodium hydroxide solution was added to the mark. The contents of the flask were thoroughly mixed and centrifuged. The supernatant was decanted, 50 ml of a solution of 0.1 M HCl was added to the mark, and the process was repeated. The acid-base washing cycle was done a total of three times. A deionized water wash was then followed by a wash with methanol. The contents of the centrifuge flasks were the dried at 110° C. for 12 h. The dried material so obtained was then ready for standard chromatographic or any other use.

(b) The same procedure described in (a) was followed using, as the alkylation reagent, the organolithium reagent prepared as above.

EXAMPLE 2

Preparation of Chlorinated Silica

After refluxing and cooling the chlorinated silica as prepared in Example 1, a reaction vessel 10 (see FIG. 1), which also contained unreacted thionyl chloride and toluene, was placed in line as shown in FIG. 1. At this time valve 14 was opened to the upper path and valve 18 was closed to reservoir 19. Valve 32 was opened to the waste and the system was purged with dry nitrogen at 5 psi. The left tube in the reaction vessel was lowered to just above the silica surface. The excess reagents were slowly pumped off into the waste without agitation of the silica. Valves 14 and 18 were turned to open the lower path and dry washing solvents (see Example 1) were cycled through the reaction vessel. After the last washing step, anhydrous ether was added to the vessel. Valves 18 and 32 were closed to isolate the chlorinated silica and the nitrogen tank was shut off. All washing reagents were added from reservoir 19 by opening valves 14 and 18 to the lower path. Each solvent change required a nitrogen purge. At this point, the chlorinated silica was ready for the addition of Grignard reagent or organolithium reagent.

Preparation of Alkylation Reagent and Clean-Up Procedure.

The same procedure was used as in Example 1.

Reaction of Grignard Reagent with Chlorinated Silica (a) Turning now to FIG. 1, the Grignard reagent was placed in reservoir 36. Valves 14 and 18 were open to the upper path and valve 32 was turned from the waste to reservoir 36. Using the stirring bar which remained in reaction vessel 10 to agitate the chlorinated silica into a suspension, the nitrogen gas pressure was used to pump the Grignard reagent from the reservoir into the reaction vessel. The reaction was allowed to proceed for 1 h. After the reaction was complete, the excess liquid was pumped off as described above. At this point the bonded phase was stable enough to allow exposure to the atmosphere.

The same washing cycle described in Example 1 was used to clean up the product after completion of synthesis.

(b) The same procedure described in (a) was followed using, as the alkylation reagent, the organolithium reagent prepared as in Example 1.

EXAMPLE 3

Evaluation of the Product

A. Fourier Transform Infrared Spectroscopy

Figure 4:
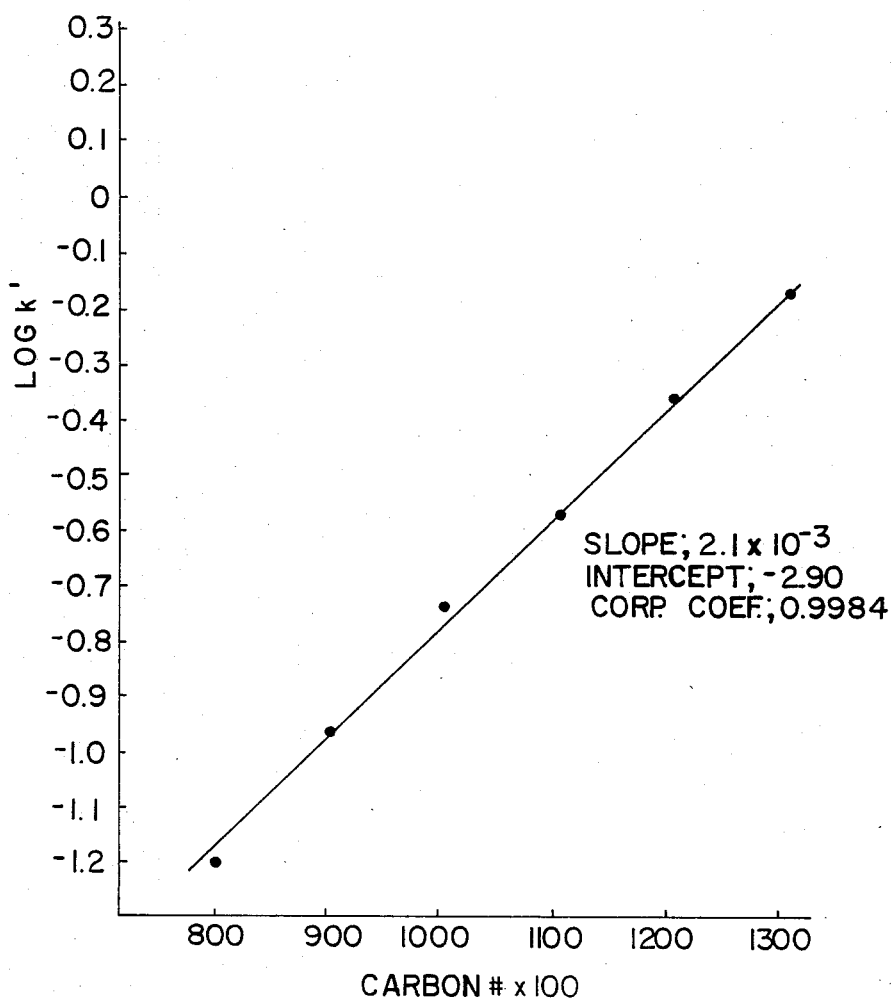
FIG. 4 represents the chromatographic evaluation of an allyl-bonded stationary phase, also as described in Example 3.

FIG. 4 gives the partial infrared spectrum of an allyl-bonded material produced using a Grignard reagent as described in Example 1. The spectrum demonstrates that the allyl material was successfully bonded to the silica. An analysis of the carbon-hydrogen stretching region is particularly useful here, as the carbon-hydrogen olefinic stretch is clearly visible at 3080 cm$^{-1}$. The success of this reaction is also confirmed by the presence of the carbon-carbon double bond stretch (indicating the presence of the allyl moiety) at 1630 cm$^{-1}$. Both spectra were obtained in the diffuse reflectance mode, and represent difference measurements between the bonded material and the unbonded silica.

B. Elemental Analysis

The method of Examples 1 and 2 have been used to produce a number of bonded phases: methyl, ethyl, allyl and n-butyl. In all cases, it was possible to obtain a surface coverage of between about 3.5 and 4.0 micromoles/m$^2$. This corresponds to the best reported surface coverage for materials produced by alkylchlorosilane reactions as given, for example, in Cheng and McCown, *J. Chrom.* 318:173-185 (1985).

C. ESCA Analysis

Figure 3:
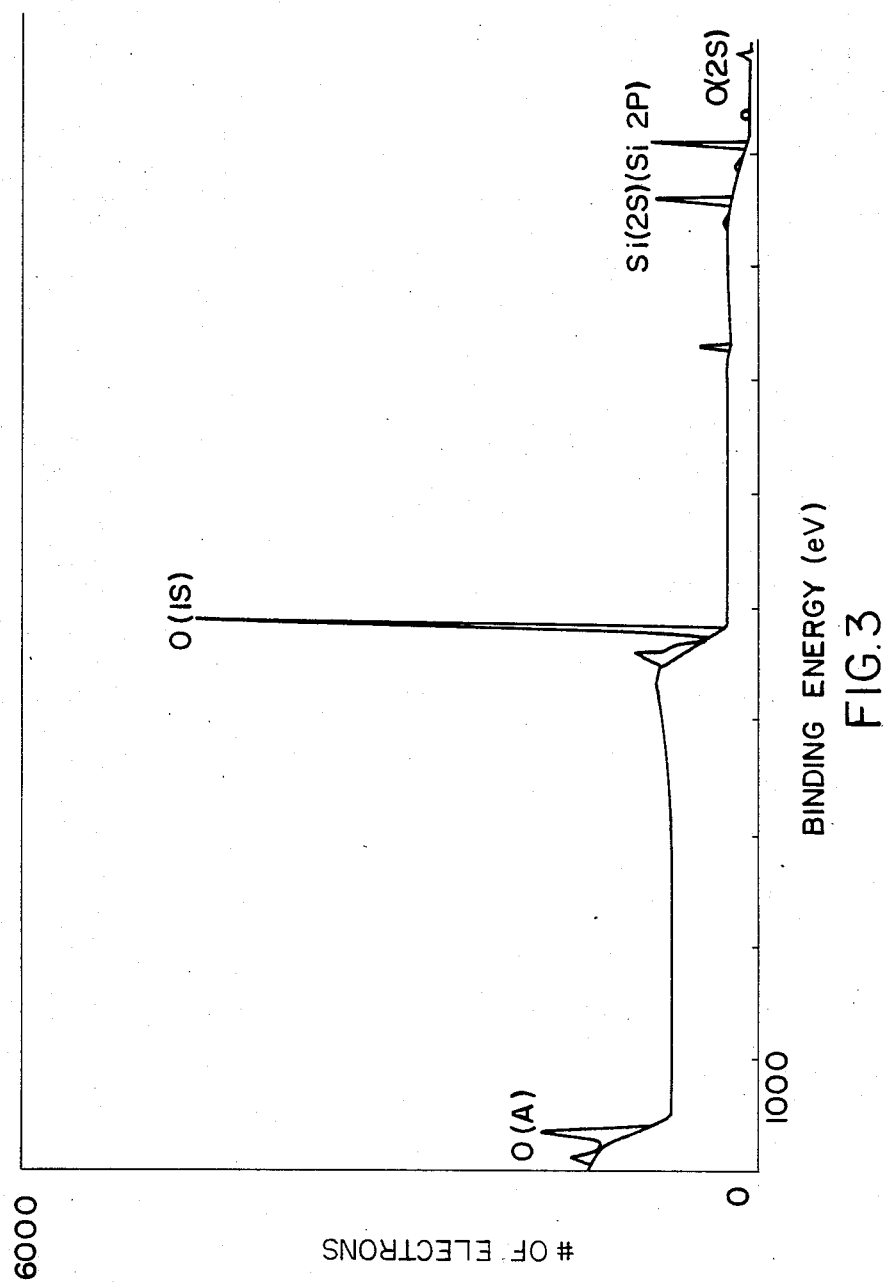
FIG. 3 gives an ESCA spectrum of an allyl-bonded stationary phase prepared according to the invention, as described in Example 3.

FIG. 3 is the ESCA spectrum of an allyl-bonded stationary phase using a Grignard reagent and the method of Example 1. Of particular interest in the ESCA analysis is information concerning the presence or absence of magnesium or halides. This information is useful in the evaluation of the clean-up procedure described above. As expected, carbon is seen in this spectrum due to the presence of the bonded hydrocarbon material. The other peaks in the spectrum are assigned to the silicon and oxygen of the base material. No evidence of any halide or magnesium is seen in this spectrum, indicating that the clean-up procedure was effective. Poorly cleaned material from Grignard reactions readily show two magnesium Auger peaks at 300 and 350 eV.

D. Chromatoqraphic Evaluation.

FIG. 6 shows a plot of log k' vs carbon×100 for a homologous series of alkylarylketones. This test is often used to evaluate chromatographic phases and to identify reverse-phase behavior (see, e.g., Smith, *J. Chrom.* 236:313 (1982)) These results are similar to those obtained when an analogous material is bonded to silica via an organochlorosilane reaction.

E. pH Stability

One of the great disadvantages of currently available silica-based materials is that they are unable to withstand prolonged exposure to pH extremes (pH less than 3 or greater than 8). An allyl-bonded stationary phase produced using a Grignard reagent and the method of by Example 1 was subject to these pH extremes for a 36-h period. Elemental analysis was then performed on these samples (see Table I). When the data were analyzed as two distinct groups, i.e., those samples subjected to high pH and those samples subjected to low pH, the statistical parameters for the two groups were as follows. For low pH: average carbon loading=2.34%, S.D. 0.25, n=3; for high pH: average carbon loading=2.01%, S.D. 0.13, n=3. An hypothesis test comparing the two means showed that they were not distinctly different (P>0.05). The average of the high pH group was well within 2 S.D. of the mean of the low pH group. (While there may be some lessening of carbon loading as pH increases, the loss at high pH is not significant.) It may thus be concluded that materials produced by the subject method described above are quite stable at pH extremes.

TABLE 1

| Effect of pH on % Carbon Loading | |
|---|---|
| pH Condition | % Carbon |
| (1) Control (Samples 2-6) | 2.21% |
| (2) pH 1 | 2.62% |
| (3) pH 2 | 2.29% |
| (4) pH 3 | 2.12% |

TABLE 1-continued

| Effect of pH on % Carbon Loading | |
|---|---|
| pH Condition | % Carbon |
| (5) pH 8 | 2.00% |
| (6) pH 9 | 1.89% |
| (7) Control (Sample 8) | 2.16% |
| (8) pH 10 | 2.14% |

What is claimed is:
1. A method for coupling an olefinically unsaturated surface-modifying group to the surface of a surface hydroxyl-containing silica material to give an acid- and base-stable surface-modified silica substantially free of contamination and capable of further functionalization through the olefinic bond present in the surface-modifying group, comprising the steps of, in sequence;
 (a) reacting the surface hydroxyl groups of the silica material with a halogenating agent in an anhydrous, aprotic solvent, thereby replacing the surface hydroxyl groups with halogenations so as to provide a halogenated silica material having a halogenated surface;
 (b) isolating the halogenated silica material from the solvent, thereby obtaining an isolated halogenated silica material;
 (c) washing the isolated halogenated silica material to remove excess halogenating agent thereby forming a washed halogenated silica material;
 (d) reacting the washed halogenated silica material with a reagent selected from the group consisting of olefinically unsaturated Grignard reagents of the formula $CH_2=CH-(CH_2)_nMgBr$ and olefinically unsaturated organolithium reagents of the formula $CH_2=CH-(CH_2)_nLi$, in which n is an integer in the range of from one to sixteen inclusive, thereby giving rise to direct covalent carbon to silicon linkages and the formation of an acid- and base-stable surface-modified silica having surface Si-$(CH_2)_n-CH=CH_2$ moieties; and
 (e) washing the acid- and base-stable surface-modified silica in the sequence of
  (i) first washing the surface-modified silica with sodium hydroxide;
  (ii) then washing the sodium hydroxide-washed surface-modified silica with hydrochloric acid; and
  (iii) repeating steps (i) and (ii) at least once.
2. The method of claim 1 wherein the silica material is particulate silica.
3. The method of claim 1 wherein the particulate silica is porous.
4. The method of claim 1 wherein the porous particulate silica has a surface area of at least about 50 M$^2$/g and a pore diameter of at least about 30 angstroms.
5. The method of claim 1 wherein the halogenating agent is a chlorinating agent.
6. The method of claim 1 wherein the chlorinating agent is thionyl chloride.
7. The method of claim 1 wherein the reagent in step (d.) is an olefinically unsaturated Grignard reagent of the formula $CH_2=CH-(CH_2)_nMgBr$ in which n is an integer in the range of from one to sixteen inclusive.
8. The method of claim 1 wherein the reagent in step (d.) is an olefinically unsaturated organolithium reagent of the formula $CH_2=CH-(CH_2)_nLi$, in which n is an integer in the range of from one to sixteen inclusive.

9. The method of claim 1 additionally comprising after (e.):
  (f) washing the washed product of step (e.) with deionized water, thereby forming a water washed product.

10. The method of claim 9 additionally comprising after (f.):
  (g) washing the water-washed product with alcohol thereby forming an alcohol-washed product.

11. The method of claim 10 additionally comprising after (g.):
  (h) drying the alcohol-washed product at a temperature of 110° C. or higher.

12. A method for coupling an olefinically unsaturated surface-modifying group to the surface of a surface hydroxyl-containing porous particulate silica material having a surface area of at least about 50 $^2$/g and a pore diameter of at least about 30 angstroms to give an acid- and base-stable surface-modified silica substantially free of contamination and capable of further functionalization through the olefinic bond present in the surface-modifying group, comprising the steps of, in sequence:
  (a) reacting the surface hydroxyl groups of the silica material with thionyl chloride in anhydrous toluene, thereby replacing the surface hydroxyl groups with chlorinations so as to provide a chlorinated silica material having a chlorinated surface;
  (b) isolating the chlorinated silica material from the toluene, thereby obtaining an isolated chlorinated silica material;
  (c) washing the isolated chlorinated silica material to remove excess thionyl chloride thereby forming a washed chlorinated silica material;
  (d) reacting the washed chlorinated silica material with an olefinically unsaturated Grignard reagent of the formula $CH_2=CH-(CH_2)_n MgBr$ in which n is an integer in the range of from one to sixteen inclusive, thereby giving rise to direct covalent carbon to silicon linkages and the formation of an acid- and base-stable surface-modified silica having surface $Si-(CH_2)hd n-CH=CH_2$ moieties;
  (e) washing the acid- and base-stable surface-modified silica in the sequence of
    (i) first washing the surface-modified silica with sodium hydroxide;
    (ii) then washing the sodium hydroxide washed surface-modified silica with hydrochloric acid; and
    (iii) repeating steps (i) and (ii) at least once, thereby forming a washed product;
  (f) washing the washed product of step (e.) with deionized water, thereby forming a water-washed product;
  (g) washing the water-washed product with alcohol, thereby forming an alcohol-washed product; and
  (h) drying the alcohol-washed product at a temperature of 110° C. or higher.

13. A method for coupling an olefinically unsaturated surface-modifying group to the surface of a surface hydroxyl-containing porous particulate silica material having a surface area of at least about 50 $M^2$/g and a pore diameter of at least about 30 angstroms to give an acid- and base-stable surface-modified silica substantially free of contamination and capable of further functionalization through the olefinic bond present in the surface-modifying group, comprising the steps of, in sequence:
  (a) reacting the surface hydroxyl groups of the silica material with thionyl chloride in anhydrous toluene, thereby replacing the surface hydroxyl groups material having a chlorinated surface;
  (b) isolating the chlorinated silica material from the toluene, thereby obtaining an isolated chlorinated silica material;
  (c) washing the isolated chlorinated silica material to remove excess thionyl chloride thereby forming a washed chlorinated silica material;
  (d) reacting the washed chlorinated silica material with an olefinically unsaturated organolithium reagent of the formula $CH_2=CH-(CH_2)_n Li$ in which n is an integer in the range of from one to sixteen inclusive, thereby giving rise to direct covalent carbon to silicon linkages and the formation of an acid- and base-stable surface-modified silica having surface $Si-(CH_2)_n-CH=CH_2$ moieties;
  (e) washing the acid- and base-stable surface-modified silica in the sequence of
    (i) first washing the surface-modified silica with sodium hydroxide;
    (ii) then washing the sodium hydroxide-washed surface-modified silica with hydrochloric acid; and
    (iii) repeating steps (i) and (ii) at least once, thereby forming a washed product;
  (f) washing the washed product of step (e.) with deionized water, thereby forming a water-washed product;
  (g) washing the water-washed product with alcohol, thereby forming an alcohol-washed product; and
  (h) drying the alcohol-washed product at a temperature of 110° C. or higher.

* * * * *